(12) United States Patent
Ohmura et al.

(10) Patent No.: US 7,344,818 B2
(45) Date of Patent: Mar. 18, 2008

(54) METHOD FOR PRODUCING TONER AND AN IMAGE FORMING METHOD EMPLOYING THE TONER

(75) Inventors: Ken Ohmura, Hachioji (JP); Hiroshi Yamazaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 320 days.

(21) Appl. No.: 10/803,611

(22) Filed: Mar. 18, 2004

(65) Prior Publication Data

US 2005/0014084 A1 Jan. 20, 2005

(30) Foreign Application Priority Data

Mar. 24, 2003 (JP) .............................. 2003-079244

(51) Int. Cl.
*G03G 9/08* (2006.01)
(52) U.S. Cl. ............................. 430/137.14; 430/137.17
(58) Field of Classification Search ........... 430/137.14, 430/108.1, 137.17
See application file for complete search history.

(56) References Cited

U.S. PATENT DOCUMENTS 5,066,560 A * 11/1991 Tan et al. ............... 430/137.17
5,976,750 A * 11/1999 Hagi et al. ............... 430/108.6
6,485,878 B2 * 11/2002 Nagase et al. ............. 430/124
6,582,867 B2   6/2003 Daimon et al.
6,602,644 B2 *  8/2003 Matsushima et al. .... 430/108.4
7,018,763 B2 *  3/2006 Matsumoto et al. ..... 430/108.7
2003/0228533 A1 * 12/2003 Yamazaki et al. ........... 430/45

FOREIGN PATENT DOCUMENTS

JP   20020278139   9/2002
JP   20020318467   10/2002

* cited by examiner

*Primary Examiner*—John L Goodrow
(74) *Attorney, Agent, or Firm*—Lucas & Mercanti, LLP

(57) ABSTRACT

A method for producing a toner comprising the step of coagulating at least one crystalline ester compound represented by Formula 1 and resin particles in an aqueous medium in the presence of and aluminum compound.

$$R_1-(OCO-R_2)_n \quad \text{Formula 1}$$

In the formula, $R_1$ and $R_2$ are each a carbon hydride group having from 1 to 40 carbon atoms which may have a substituent and n is an integer of from 1 to 4.

21 Claims, 2 Drawing Sheets

METHOD FOR PRODUCING TONER AND AN IMAGE FORMING METHOD EMPLOYING THE TONER

BACKGROUND

1. Technical Field

The invention relates to a process for producing toner for electrophotographic use and an image forming method employing the toner.

2. Related Art

Recently, the main stream of the image forming by electrophotographic system is shifted to the digital system. In the image formation by the digital system, a toner having small diameter is used so as to realizing superior fine line reproducibility and high resolution such as development of a small dot image on the level of 1,200 dpi; dpi is the number of the dot per 2.54 cm. Japanese Patent Publication Open to Public Inspection, hereinafter referred to as Japanese Patent O.P.I. Publication, No. 2002-296839, Paragraph 0011, and No. 2002-351140, Paragraph 0011, describe a toner producing method as an example of production of such the small diameter toner, in which raw materials of the toner such as polyester resin are dispersed in an aqueous medium and the resin particles in the emulsion are coagulated so as to form particles having the size of the toner.

As an embodiment of the digital image formation, a print on demand system for "necessary copies at necessary time" is performed. The image formation by such the system is noted as a system to be applied in place of light printing since the plate making to be performed in the usual printing process is not necessary and the publishing of several hundreds copies of books is possible, and direct mails or invitation cards each having different address can also be printed.

It has been found that the electrophotographic image formation causes a problem on the preparation of a mail or an invitation card each having a different address. The problem is that a sufficient fixing effect is difficultly obtained when the image is formed on a thick paper such as an invitation card to a marriage party, a mourning mail card or a card regarding funeral rites. Particularly, in the mourning mail card or the card regarding funeral rites having a gray colored frame, the gray frame is difficultly fixed and the unfixed toner causes the contamination of the hand of the handler or the paper surface.

Moreover, when the toner image is formed on the thick paper, considerably larger stress is applied to the toner comparison to that when the toner image is formed on usual paper such as copy paper. Consequently, the toner is easily destroyed on the occasion of the image formation and a problem is raised that the paper surface is contaminated by fine particles formed by the crush of the toner particle.

The mourning mail card is one of the recording media having the highest difficulty, and other than that it is necessary for diffusing the electrophotographic system as the on demand image forming system that the toner image can be stably formed not only on paper developed for electrophotographic use but on the paper for printing. The electrophotographic system is difficultly accepted by the field of printing industry as long as such the condition is not cleared.

Moreover, it is often seen that a commuter reads a paperback held in one hand while holding him on to a strap by another hand. The copy is required-a sliding ability capable of turning over the page of the book by one hand in such the situation and a strength of the sufficient fixation strength of the toner so that the toner does not contaminate the paper surface or the characters by friction.

The toner image by the electrophotography, however, is not accepted by the publisher since the sliding ability and the fixation strength of the image is inferior to those of the usual printed material. Therefore, the diffusion of the electrophotography in this field has been delayed.

Furthermore, when a lot of prints are copied by a copying machine utilizing a trickle method, by which large stress tends to be loaded to the toner particles, a trouble is raised that the interior of the equipment is contaminated since the toner particles are crushed or the external additive is buried into the toner particles so as to the charged amount of the toner cannot be held at a constant level and the particles unstably charged are scattered.

Consequently, atoner production method, a toner and an image forming method are required, which are superior in the fixing ability on the thick paper or paper for offset printing, toner blister is not formed and the contamination in the machine caused by the toner scattering does not occur when a lot of prints are copied.

SUMMARY

A method for producing toner comprising the step of coagulating at least one crystalline ester compound represented by Formula 1 and resin particles in an aqueous medium in the presence of an aluminum compound.

Formula 1

In the formula, $R_1$ and $R_2$ are each a carbon hydride group having from 1 to 40 carbon atoms which may have a substituent and n is an integer of from 1 to 4.

BRIEF DESCRIPTION OF THE DRAWINGS

The present invention will become more fully understood from the detailed description given hereinbelow and the accompanying drawings which are given by way of illustration only, and thud are not intended as a definition of the limits of the present invention, and wherein.

DETAILED DESCRIPTION

Figure 1:
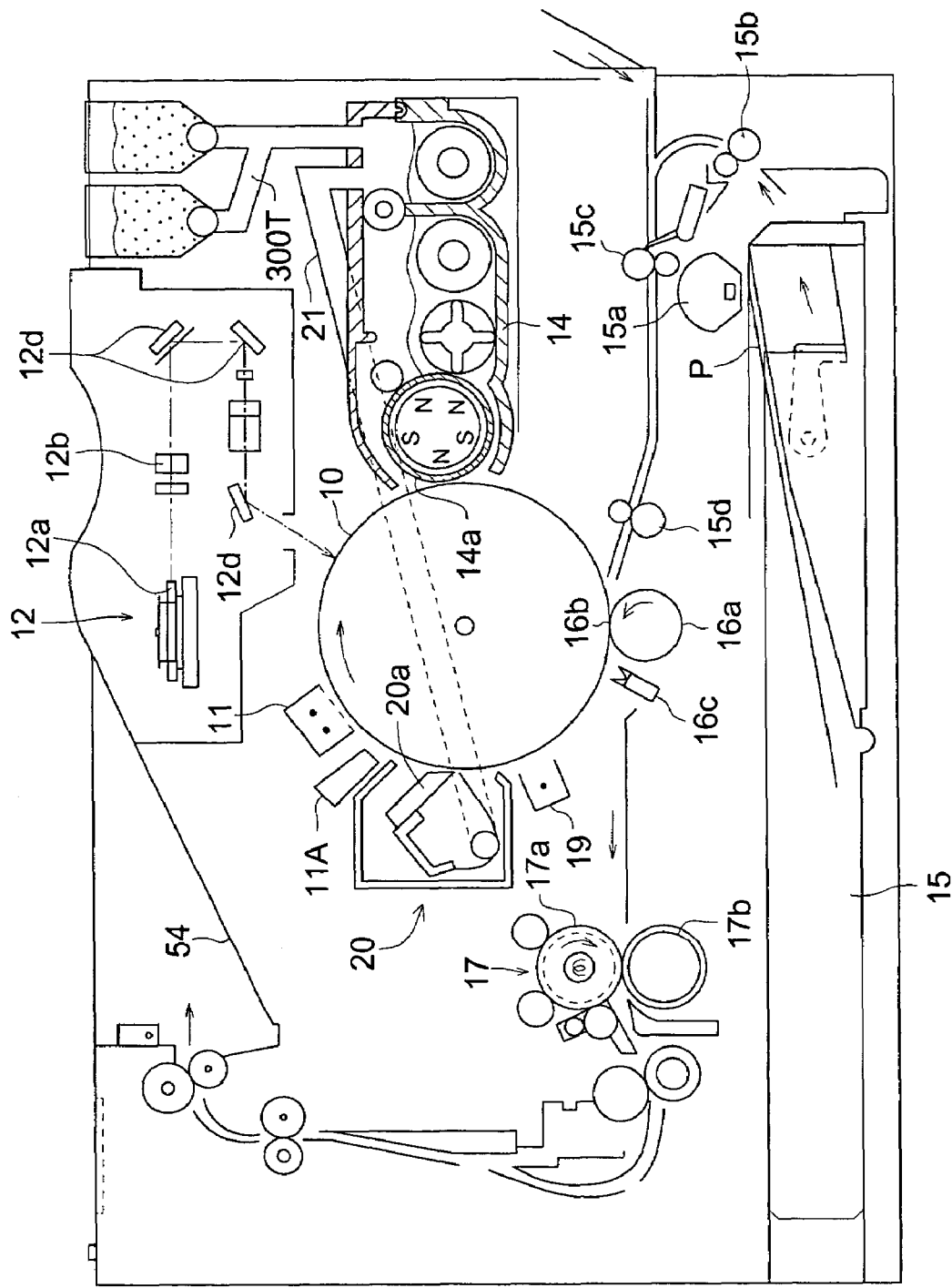
FIG. 1 shows a cross section of an image forming apparatus showing an example of the image forming method utilizing the trickle system.

The invention is described in detail below.

It has been found by the inventors that the specific ester compound used in a toner particle as a mold-releasing agent is uniformly included in the toner particle and the amount of the mold-releasing agent adhered onto the toner surface is small in a toner obtained by a method comprising the step of coagulating particles of a crystalline ester compound represented by Formula 1, hereinafter referred to as the specific ester compound, or particles substantially composed of the ester compound and resin particles in an aqueous medium in the presence of an aluminum compound, and the toner obtained by a method comprising the step of coagulating resin particles containing a mold-releasing agent composed of the specific ester compound or the particles containing the ester compound and the resin.

When an image is formed by the toner in which a small amount of the mold-releasing agent is adhered onto the surface of the toner particle, the adhesion force of the toner to the fibers of the image transfer paper is strengthen and sufficient fixation can be realized on the thick paper and the sliding ability is raised and the resistivity to friction is improved even when smooth paper is used since the mold-releasing agent is not oozed out to the surface of the fixed image. Moreover, the scattering of the toner caused by the instability of the charge of the toner is inhibited and contamination in the apparatus can be prevented since the surface of the carrier of-the developer is not contaminated by the mold-releasing agent even when a lot of copies are printed and the charging amount of the toner is constantly stabled. The sufficient fixation can be obtained even when the roller-in-roller type fixing equipment which is suitable for high speed fixation.

The aluminum compound used as the coagulation agent can be easily removed by washing by water from the toner obtained by the producing method according to the invention so that the amount of the coagulation agent remained in the toner particle can be reduced.

When a black image is formed by a toner containing a large amount of the coagulation agent and fixed by heating, the moisture taken into the toner accompanied with the coagulation agent is evaporated to form steam and the steam is passed through the toner layer of the solid black image. The trace of the pass causes a white spot like defect, a toner blister. The amount of the coagulation agent remained in the toner according to the invention is small. Consequently, the amount of the absorbed moisture is small and the toner blister is not formed.

The toner of the invention has high resistivity to destroying since the mold-releasing agent is uniformly included in the toner particle and suitably can be used in the developing equipment utilizing the trickle system.

The producing method for toner is described below.

The toner producing method preferably comprised a step of coagulating particles of the specific ester compound and synthesized resin particles in an aqueous medium in the presence of an aluminum compound or a step on which resin particles containing the mole releasing agent are prepared at once and then the resin particles are coagulated, namely coagulated stepwise.

The resin particle containing the mold-releasing agent is preferably prepared according to the following 1) through 3).

1) Droplets of the specific ester compound are added to a solution of a polymerizable monomer, and then the polymerizable monomer is polymerized.

2) The polymerizable monomer is added to a solution of the specific ester compound, and then the polymerizable monomer is polymerized.

3) The polymerized monomer and the droplets of the specific eater compound are added to a resin particle dispersion.

The weight average diameter of the mole releasing agent-containing resin particle or the resin particle is preferably from 50 to 2,000 nm.

The toner production method is concretely described below; the invention is not limited thereto.

<Toner Production Method from the Resin Particle Dispersion, the Mold-Releasing Agent Particle Dispersion and a Colorant Particle Dispersion>

$1^{st}$ step: A step of preparing a resin particle dispersion by synthesizing binder resin and dispersing the binder resin in an aqueous medium $2^{nd}$ step: A step of preparing a mold-releasing agent dispersion by dispersing the specific ester compound in an aqueous medium $3^{rd}$ step: A step of preparing a colorant particle dispersion by dispersing colorant particles in an aqueous medium $4^{th}$ step: A step of preparing coagulated particles by coagulating the resin particles, the mold-releasing agent particles and the colorant particles in the aqueous medium in the presence of an aluminum compound.

$5^{th}$ step: A step of separating the coagulated particles from the aqueous medium by filtration and removing a surfactant by washing by water $6^{th}$ step: A step of preparing toner particles by drying the washed particles $7^{th}$ step: A step of producing a toner by adding exterior additive to the toner particles <Toner Production Method by Preparing Mold-Releasing Agent-Containing Resin Particles by Polymerizing a Polymerizable Monomer>

$1^{st}$ step: A step of preparing a dispersion of mold-releasing agent-containing resin particles by an association method after dispersing a polymerizable monomer solution in which the specific ester compound is dissolved $2^{nd}$ step: A step of preparing a colorant particle dispersion by dispersing a colorant in an aqueous medium $3^{rd}$ step: A step of preparing coagulated particles by coagulating the mold-releasing agent containing-resin particles and the colorant particles in an aqueous medium in the presence of an aluminum compound $4^{th}$ step: A step of separating the coagulated particles from the aqueous medium by filtration and removing a surfactant by washing by water $5^{th}$ step: A step of preparing toner particles by drying the washed particles $6^{th}$ step: A step of producing a toner by adding exterior additive to the toner particles <Toner Producing Method by Preparing a Mold-Releasing Agent Containing-Binder Resin Particle>

$1^{st}$ step: A step of synthesizing a polyester or polyol resin $2^{nd}$ step: A step of preparing a solution by dissolving or dispersing the synthesized resin and a mold-releasing agent $3^{rd}$ step: A step of preparing a mold-releasing agent containing-resin droplets dispersion by dispersing the solution in an aqueous medium by a mechanical means and then removing the solvent $4^{th}$ step: A step of preparing coagulated particles by coagulating the mold-releasing agent-containing resin particles and the colorant particles in an aqueous medium in the presence of an aluminum compound $5^{th}$ step: A step of filtering the coagulated particles from the aqueous medium and removing a surfactant by washing by water $6^{th}$ step: A step of preparing toner particles by drying the washed particles $7^{th}$ step: A step of producing a toner by adding exterior additive to the toner particles Next, the compound to be used in the toner producing method is described below.

<Specific Ester Compound>

The crystalline ester compounds represented by Formula 1 are preferably used as the mold-releasing agent.

$$R_1-(OCO-R_2)_n \qquad \text{Formula 1}$$

In Formula 1, $R_1$ and $R_2$ are each a carbon hydride group which may have a substituent.

The number of carbon atoms in the carbon hydride group $R_1$ is from 1 to 40, preferably from 1 to 20, and more preferably from 2 to 5, including the carbon atoms in the substituent.

The number of carbon atoms in the carbon hydride group $R_2$ is from 1 to 40, preferably from 16 to 30, and more preferably from 18 to 26, including carbon atoms of the substituent.

n is an integer of from 1 to 4, preferably from 2 to 4, more preferably 3 and 4, and particularly preferably 4.

The specific ester compounds may be suitably synthesized by a dehydration condensation reaction of an alcohol and a carboxylic acid.

As the most preferably specific ester compound, tetrabehenate of pentaerythrytol is cited.

The following compounds 1) through 26) are exemplified as the concrete examples of the specific ester compound.

1) $CH_3-(CH_2)_{12}-COO-(CH_2)_{17}-CH_3$
2) $CH_3-(CH_2)_{18}-COO-(CH_2)_{17}-CH_3$
3) $CH_3-(CH_2)_{20}-COO-(CH_2)_{21}-CH_3$
4) $CH_3-(CH_2)_{14}-COO-(CH_2)_{19}-CH_3$
5) $CH_3-(CH_2)_{20}-COO-(CH_2)_6-O-CO-(CH_2)_{20}-CH_3$

6)
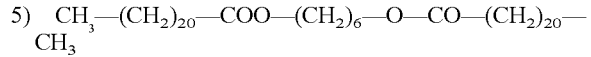

7)
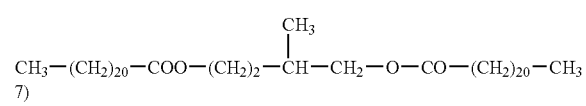

8)
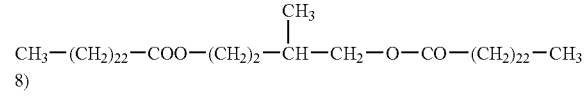

9)
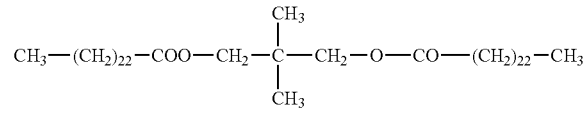

10)
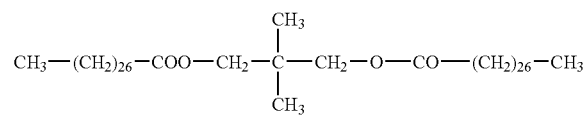

11)
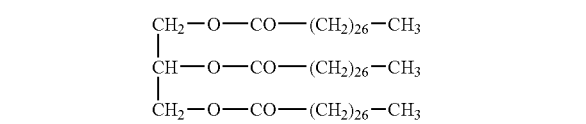

12)
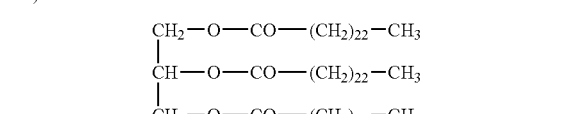

13)
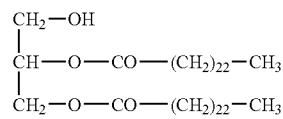

14)
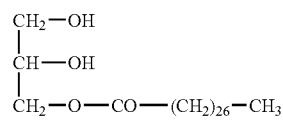

15)
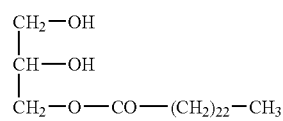

16)
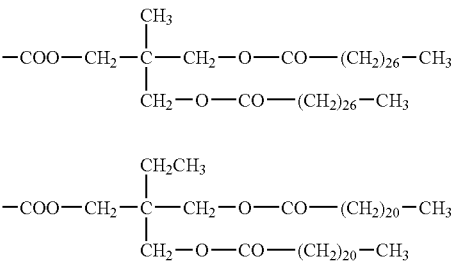

17)
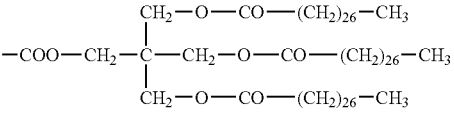

18)
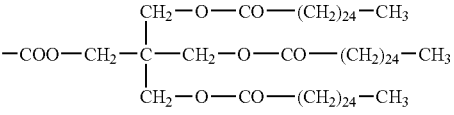

19)
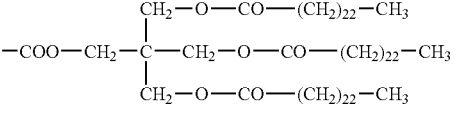

20)
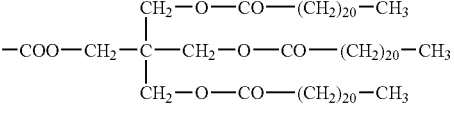

21)
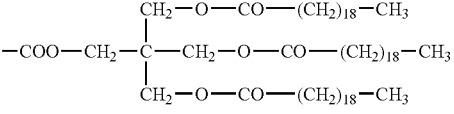

22)
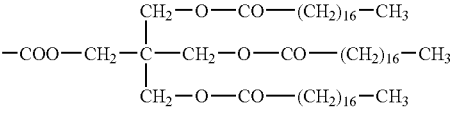

23)
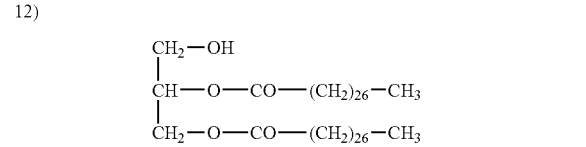

-continued

24)
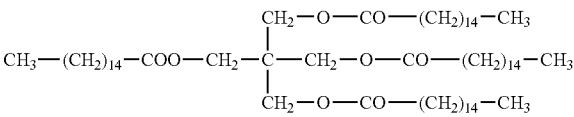

25)
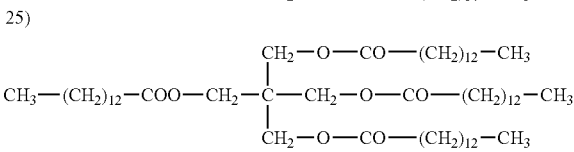

26)
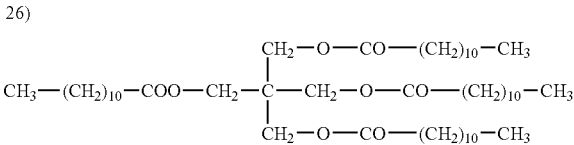

The content of the specific ester compound is from 1 to 30%, preferably from 2 to 20%, and more preferably from 3 to 15%, of the entire weight of the toner.

<Aluminum Compound>

An aluminum compound is preferably used as the coagulation agent.

The aluminum compounds selected from the metal salts are preferably used even though there is not any limitation. In concrete, tri-valent aluminum metal salts are usable. Concrete examples include aluminum chloride, aluminum hydroxide, poly(aluminum chloride), poly(aluminum hydroxide), poly(aluminum sulfate silicate), poly(aluminum sulfate), poly(aluminum fluoride), poly(ammonium aluminum sulfate) and Poly(aluminum phosphate), but the compound is not limited thereto. The aluminum compound may be used together with a known coagulation agent.

It is preferable that each of these coagulation agents is added in an amount of more than the critical coagulation concentration. The critical coagulation is an indicator relating to the stability of an aqueous dispersion and indicates the concentration necessary for occurring the coagulation. The critical coagulation concentration is largely varied depending on the emulsified component and the dispersant itself. The critical coagulation concentration is described in, for example, S. Okamura et al. "Koobunshi Kagaku (High Molecular Compound Chemistry)", 17, 601 (1960), edited by Nihon Koobunshi Gakkai, by which the critical coagulation concentration be known in detail. By another way, the critical coagulation concentration can be obtained by adding a desired salt in various concentrations to the objective dispersion and measuring the ζ-potential of the dispersion. The concentration of the salt at which the ζ-potential is changed is determined as the critical coagulation concentration.

It is allowed that the adding amount of the coagulation agent is more than the critical coagulation concentration, and the amount is preferably 1.2 times or more, and more preferably 1.5 times or more, of the critical coagulation concentration.

The aqueous medium is water or a mixture of water and a solvent permissible with water. Another substance may be contained within the range in which the effect of the invention is substantially not hindered.

The water-permissible solvent is a solvent capable of being infinitely dissolved in water, and the solvent which cannot dissolve the formed resin is selected. In concrete, an alcohol such as methanol, ethanol, propanol, isopropanol, t-butanol, methoxyethanol and butoxyethanol, a nitrile such as acetonitrile, and an ether such as dioxane, are usable. Particularly, ethanol, propanol and isopropanol are preferred.

The adding amount of the water-permissible solvent is preferably from 1 to 100 volume-% of the polymer-containing dispersion containing the coagulation agent.

A coagulation stopping agent may be added to stop the coagulation. As the coagulation stopping agent, sodium hydroxide and sodium chloride may be used.

<Polymerizable Monomer and Binder Resin>

Polymerizable Monomer

As the polymerizable monomer for forming the resin (binder), a hydrophobic monomer is used as the constituent and a corosslinkable monomer is used according to necessity. It is preferable to contain at least one kind of monomer having an acidic polar group or a basic polar group.

(1) The Hydrophobic Monomer

As the hydrophobic monomer constituting the monomer composition, known monomers may be used without any limitation. One or a combination of two or more kinds of monomer can be used so as to satisfy the required properties.

Concrete examples of the monomer include a mono-vinyl aromatic monomer, a (meth)acrylate monomer, a vinyl ester monomer, a vinyl ether monomer, mono-olefin monomer, di-olefin monomer and halogenated olefin monomer.

Examples of the vinyl aromatic monomer include a styrene monomer such as styrene, o-methylstyrene, m-methylstyrene, p-methylstyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene and 3,4-dichlorostyrene.

Examples of the (meth)acrylate monomer include acrylic acid, methacrylic acid, methyl acrylate, ethyl acrylate, butyl acrylate, 2-ethylhexyl acrylate, cyclohexyl acrylate, phenyl acrylate, methyl methacrylate, ethyl methacrylate, butyl methacrylate, hexyl methacrylate, 2-ethylhexyl methacrylate, ethyl β-hydroxyacrylate, propyl γ-aminoacrylate, stearyl methacrylate, dimethylaminoethyl methacrylate and diethylaminoethyl methacrylate.

Examples of the vinyl ester monomer include vinyl acetate, vinyl propionate and vinyl benzoate, and examples of vinyl ether monomer include vinyl methyl ether, vinyl ethyl ether, vinyl isobutyl ether and vinyl phenyl ether.

Examples of the mono-olefin monomer include ethylene, propylene, isobutylene, 1-butene, 1 pentene and 4-methyl-1-pentene, and those of di-olefin monomer include butadiene, isoprene and chloroprene.

(2) The Crosslinkable Monomer

A crosslinkable monomer may be added to improve the property of the resin particle. Examples of the crosslinkable monomer include divinylbenzene, divinylnaphthalene, divinyl ether, diethylene glycol methacrylate, ethylene glycol dimethacrylate, poly(ethylene glycol dimethacrylate and diallyl phthalate each having two or more unsaturated bonds.

(3) The Monomer Having an Acidic Polar Group

Examples of the monomer having an acidic polar group include (a) an α,β-ethylenic unsaturated compound having a carboxylic group (—COOH) and (b) an α,β-ethylenic unsaturated compound having a sulfonic acid group (—SO₃H).

Examples of (a) an α,β-ethylenic unsaturated compound having a carboxylic group include acrylic acid, mathacrylic acid, fumalic acid, maleic acid, itaconic acid, cinnamic acid, monobutyl maleate and monooctyl maleate, and their salts of a metal such as Na and Zn.

Examples of (b) an α,β-ethylenic unsaturated compound having a sulfonic group include sulfonated styrene and sodium salt thereof, allylsulfosuccinic acid, octyl allylsulfosuccinate and their sodium salts. The monomer having a basic polar group (4) The Monomer Having a Basic Polar Group As the monomer having a basic polar group, (a) (meth)acrylate of an aliphatic alcohol having an amino group or a quaternary ammonium group and from 1 to 12, preferably from 2 to 8, particularly preferably 2, carbon atoms, (b) (meth)acrylamide and a (meth)acrylamide substituted by mono- or di-alkyl having from 1 to 18 carbon atoms on an optional nitrogen atom, (c) a vinyl compound substituted by a heterocyclic group containing a nitrogen atom as the constituent thereof and (d) N,N-diallyl-alkylamine or its quaternary ammonium salt can be exemplified. Among them, the (meth)acrylate of the aliphatic alcohol having an amine group or a quaternary ammonium group of (a) is preferable as the polymerizable monomer having a basic polar group.

Examples of (meth)acrylate of aliphatic alcohol having an amine group or a quaternary ammonium group of (a) include dimethylaminoethyl acrylate, dimethylaminoethyl methacrylate, diethylaminoethyl acrylate, diethylaminoethyl methacrylate and their quaternary ammonium salt, 3-dimethylaminophenyl acrylate and 2-hydroxy-3methacryloxipropyltrimethylammonium salt.

Examples of the (meth)acrylamide and the (meth)acrylamide substituted by mono- or di-alkyl on an optional nitrogen group include acrylamide, N-butylacrylamide, N,N-dibutylacrylamide, piperidylacrylamide, methacrylamide, N-butylmethacrylamide, N,N-dimethylacrylamide and N-octadecylacrylamide.

Examples of the vinyl compound substituted by a heterocyclic group having a nitrogen atom as the constituent thereof of (c) include vinylpridine, vinylpyrrolidone, vinyl-N-methylpyridinium chloride and vinyl-N-ethylpyridinium chloride.

Examples of the N,N-diallylalkylamine of (d) include N,N-diallylmethylammonim chloride and N,N-diallylethylammonium chloride.

Binder Resin

Examples of the binder resin include a homo- or copolymer of a styrene such as styrene and chlorostyrene, a mono-olefin such as ethylene, propylene, butylene and isopropylene, a vinyl ester such as vinyl acetate, vinyl propionate, vinyl benzoate and vinyl butylate, an α-methylene aliphatic mono-carboxylate such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, a vinyl ether such as vinyl methyl ether, vinyl ethyl ether and vinyl butyl ether, and a vinyl ketone such as vinyl methyl ketone, vinyl hexyl ketone and vinyl isopropenyl ketone. As the typical binder resin, polystyrene, styrene-acrylic acid copolymer, styrene-alkyl methacrylate copolymer, styrene-acrylonitrile copolymer, styrene-butadiene copolymer, styrene-maleic anhydride copolymer, polyethylene and polypropylene are cited. Furthermore, polyester, polyurethane, epoxy resin, silicone resin, polyamide, modified rosin and paraffin wax can be cited.

<Colorant>

Known dyes and pigments are usable as the colorant when they are possible to be used. Concrete example of the colorant include Carbon black, nigrosin dye, iron black, Naphthol Yellow S, Hansa Yellow (10G, 5G and G), cadmium yellow, yellow iron oxide, loess, chrome yellow, titanium yellow, polyazo yellow, oil yellow, Hansa Yellow (G, R, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, Isoindolinone Yellow, iron oxide red, red lead, vermilion lead, cadmium red, cadmium mercury red, antimony vermilion, Permanent Red 4R, Parared, Faisay Red, Parachloroorthonitroaniline Red, Resol Fast Scarlet G, Brilliant Carmine BS, Permanent Red (F2R, F4R, FRL, FRLL and F4RH), Fast Scarlet VD, Vulcan Fast Rubin B, Brilliant Scarlet G, Resol Rubin GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, Bon Maroon Light, Bon Maroon Medium, Eosin lake, Rhodamine Lake B, Rhodamine Lake Y, Alizarin lake, Thioindigo Red B, Thioindigo Malune, Oil Red, Quinacridone Red, Pyrazolone Red, Polyazo Red, Chrome Vermilion, Benzidine Orange, Perynone Orange, Oil Orange, Cobalt Blue, Celurian Blue, Alkali Blue Lake, Peacock Blue Lake, Victoria Blue Lake, Non-metal Phthalocyanine Blue, Phthalocyanine Blue, Fast Sky Blue, Indanthrene Blue (RS and BC), indigo, ultramarine, Prussian Blue, Anthraquinone Blue, Fast Violet B, Methyl Violet Lake, Cobalt Purple, Manganese Purple, Dioxane Violet, Anthraquinone Violet, Chrome Green, Zinc Green, chromium oxide, Pyridian, Emerald Green, Pigment Green B, Naphthol Green B, Green Gold, Acid Green Lake, Malachite Green Lake, Phthalocyanine Green, Anthraquinone Green, titanium oxide, zinc white, lithpone and their mixture.

The using amount is usually from 1 to 10 parts by weight to 100 parts by weight of the binder resin.

<Charge Control Agent>

A charge control agent may be used according to necessity. As the charge control agent, known ones can be used, for example, a nigrosin dye, a triphenylmethane dye, a chromium-containing metal complex dye, a molibdic acid chelate pigment, a Rhodamine dye, an alkoxylamine, a quaternary ammonium salt including fluorine-modified quaternary ammonium salt, an alkylamide, elemental phosphor and a compound thereof, elemental tungsten and a compound thereof, a fluorinated surfactant, a metal salt of salicylic acid and that of a salicylic acid derivative. Concrete examples include Bontron 03 of nigrosin dye, Bontron P-51 of quaternary ammonium salt, Bontron S-34 of azo-metal complex compound, Bontron E-84 of salicylic acid metal complex and E-89 of phenol condensation product, each produced by Orient Kagaku Kogyo Co., Ltd., TP-302 and TP-415 of quaternary ammonium salt molybdenum complex, produced by Hodogaya Kagaku Kogyo CO., Ltd., Copy Charge PSY and VP2038 of quaternary ammonium salt, Copy Blue PR of triphenylmethane derivative, Copy Charge NEGVP2036 and Copy Charge NXVP434 of quaternary ammonium salt, each produced by Hoechst Co., Ltd., LRA-901 of quaternary ammonium salt and LR-147 of boron complex, each produced by Nihon Carlit Co., Ltd., copper phthalocyanine, perylene, quinacridone, azo pigment and a polymer having a functional group such as a sulfonic acid group, a carboxyl group and a quaternary ammonium salt. Among them, the azo-metal complex compounds are preferred. For example, those described in Japanese Patent O.P.I. Publication No.2002-3521150, paragraphs 0009 to 0012 are preferably used.

<Irregular-Shaped Fine Particle>

An irregular-shaped fine particle having a.reversal polarity to the charging property of the toner is preferably used as an external additive. The irregular-shaped fine particle is preferably constituted by an organic material as the principal material even though inorganic and organic materials may be used as the principal constituent. When the organic material is used as the principal constituent, the stable development can be easily carried out since the specific gravities of the almost organic materials are smaller than that of the inorganic material. Moreover, the wearing of the photoreceptor and the degradation of the cleaning equipment can be prevented since the hardness of the organic material is low.

Examples of the organic resin include a homo- and co-polymer of a styrene such as styrene and chlorostyrene, a mono-olefin such as ethylene, propylene, butylene and isoprene, a vinyl ester such as vinyl acetate, vinyl propionate and vinyl benzoate, an α-methylene aliphatic mono-carboxylate such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, a vinyl ether such as vinyl ethyl ether and vinyl ethyl ether, and a vinyl ketone such as vinyl methyl ketone, vinyl hexyl ketone and vinyl isopropenyl ketone, even though the material is not limited to the above-mentioned.

As the particular typical resin, polystyrene resin, polyester resin, styrene-alkyl acrylate copolymer, styrene-alkyl methacrylate copolymer, styrene-acrylonitrile copolymer, styrene-butadiene copolymer, styrene-maleic anhydride copolymer, polyethylene resin and polypropylene resin can be cited. Furthermore, polyurethane resin, epoxy resin, silicone resin, polyamide resin and modified rosin are usable.

A known additive such as the charge control agent, a lubricant, and an inorganic fine particle may be internally or externally added to the irregular-shaped fine particle. Examples of the lubricant include a solid lubricant such as graphite, molybdenum disulfide, talc, a fatty acid, and a metal salt of fatty acid, a low molecular weight polyolefin such as polypropylene, polyethylene and polybutene, a silicone having a heat softening point by heating, an aliphatic acid amide such as oleic acid amide, erucic acid amide, ricinoleic acid amide and stearic acid amide, a vegetable wax such as carnauba wax, rice wax, candelilla wax, Japan wax and hohoba oil, an animal wax such as beeswax, a mineral and petroleum wax such as montan wax, ozokerite, ceresin, paraffin wax, microcrystalline wax and Fischer-Tropsch wax, and modified products of the above-mentioned. These materials may be used singly or in combination of two or more kinds. As the inorganic fine particle, for example, silica, titanium oxide, metatitanic acid, alumina, zinc oxide, zirconia, magnesia, calcium carbonate and magnesium carbonate are cited even though there is no specific limitation on the inorganic fine particle. Silica, titanium oxide and metatitanic acid are frequently used. These materials may be used singly or in combination of two or more kinds.

<Monodispersed Spherical Silica>

Moreover, it is preferable to use monodispersed spherical silica as an external additive which has a volume average diameter of from 80 nm to 300 nm. The referable range of the volume average diameter is from 100 to 200 nm.

When the volume average diameter is not less than 80 nm, the silica on the surface of toner particle is not buried during the using period and the charging amount can easily be held at constant. When the average diameter is not more than 300 nm, the silica is difficultly released and easily adhered stably and uniformly to the toner particle surface. Therefore, the charging amount can be constantly held and white contamination of the developing equipment on the occasion of the development by the silica released from the toner particles can be prevented.

The spherical monodispersed silica is preferably one obtained by a sol-gel method, a kind of wet method. The dispersibility can be further controlled by varying the kind and the amount of the hydrophobilizing agent in the sol-gel method. The volume average diameter can be optionally controlled according to the weight ratio of alkoxysilane, ammonia, alcohol and water, the reaction temperature, the stirring speed and the supplying rate in the hydrolysis and the condensation-polymerization process.

In the toner, the irregular shaped and the monodispersed spherical silica may be used in mixture. The mixing can be performed in the same manner as known external addition, without any limitation. A known external additive other than the irregular-shaped fine particle and the monodispersed spherical silica may be added according to necessity.

The image forming method using the foregoing toner is described below.

FIG. 1 is the cross section of an image forming apparatus showing an example of the image forming method using the trickle system.

The image forming apparatus shown in FIG. 1 is an image forming apparatus in which toner recycling is performed, namely the toner remained after the transfer is recovered by the cleaning means and the recovered toner is supplied to the developing equipment to be reused, and the toner and the carrier are suitably supplied to the developing equipment by the trickle system.

In FIG. 1, 10 is a photoreceptor drum as a static latent image carrier constituted by, for example, an organic photoreceptor, OPC photoreceptor, coated on an electroconductive drum, which is grounded and driven clockwise to be rotated. 11 is a scorotron charging equipment for giving uniform negative charge by corona discharge to the peripheral surface of the photoreceptor drum 10 so that the potential of the drum surface is become to $V_H$. The peripheral surface of the photoreceptor is discharged in advance of the charging by the scorotron charging equipment 11 by exposing by a pre-exposure means PCL11A using a light emission diode for removing the hysteresys of the photoreceptor until the latest printing.

After the uniformly charging of the photoreceptor drum 10, imagewise exposure according to the image information is given by a laser writing equipment 12. In the imagewise exposure process, the image information output from a computer or an image reading equipment is processed by an image processor and input to the laser writing equipment 12 to perform the image wise exposure. Thus the static latent image is formed on the photoreceptor drum 10.

The main scanning is carried out by a light beam generated from a laser diode, not shown in the drawing, and turned by a rotating polygon mirror 12a, a fθ lens 12b and plural reflection mirrors 12d in the laser writing equipment 12, and the static latent image is formed by the sub-scanning by the rotation of the photoreceptor drum 10. In this examples, the exposure is given to the image forming portion according to the image information so that a reversal latent image is formed in which the absolute value of potential of the exposed portion is lowered to $V_L$.

At the periphery of the photoreceptor drum 10, a developing equipment 14 is arranged in which a negatively charged two-component toner composed of an electroconductive toner and a magnetic carrier is included, and the reversal development is carried out by a developing sleeve including a magnet and holding the developer.

The developer layer formed on the developing sleeve is conveyed into the developing zone while the layer thickness is regulated to 0.1 to 0.6 mm.

The space between the developing sleeve and the photoreceptor 10 in the developing zone is set from 0.2 to 1.0 mm which is thicker than the thickness of the developer layer, and a alternative current bias voltage $V_{AC}$ overlapping with a direct current voltage $V_{DG}$ is applied between the developing sleeve and the photoreceptor drum 10. The polarity of the charge of the toner, negative, is the same as that of the direct current voltage $V_{DC}$. Consequently, the toner released from the carrier by the alternative current voltage $V_{AC}$ is not adhered to the portion having an absolute potential $V_H$ higher than the direct current voltage $V_{DC}$ and adhered to the portion having the lower absolute potential $V_L$ in an amount corresponding to the potential difference, thus the visualization of the image, reversal development, is carried out. It is allowed that the direct current voltage $V_{DC}$ is only applied between the developing sleeve and the. photoreceptor drum 10. The development may be either non-contact development or contact development. The photoreceptor drum carrying the toner image is subjected to the transfer treatment in the next transfer process.

On the other hand, a recording paper P conveyed until timing roller 15d from the paper supplying cassette 15 through a semicircular roller 15a and conveying rollers 15b and 15c is temporarily stopped, and then conveyed by rotation of the timing roller 15d into the transfer zone 16b when the timing is adjusted. In the transfer zone 16b, a transfer roller 16a is contacted by pressure to the peripheral surface of the photoreceptor drum 10 while synchronizing with the timing of transfer. To the transfer roller 16b, a high voltage of the polarity reverse to that of the charge of the toner is applied. The supplied recording paper P is inserted between the transfer roller and the photoreceptor and the toner image on the photoreceptor drum is transferred onto the recording paper.

The charge of the recording paper P on which the toner image is transferred is eliminated by a point head electrode 16c arranged so as to make a slight space, and then the paper is separated from the surface of the photoreceptor drum and conveyed to the fixing equipment 17. In the fixing equipment, the transferred toner image is molten and fixed onto the recording paper P by heating and pressing by a heating roller 17a and a pressure roller 17b, and output onto a tray 54 by an output roller.

The transfer roller 16a is released from the periphery of the photoreceptor drum 10 during the passing off of the recording paper P to the next image transfer.

The photoreceptor drum 10 is subjected to electricity elimination by an electricity eliminator 19 using an alternative current corona discharger, and arrived at a cleaning equipment 20. The toner remained on the photoreceptor drum is scraped off into the cleaning equipment 20 by a rubber cleaning blade 20a, the recovered toner scraped off from the drum is conveyed to the developing equipment 14 through a recovered toner conveying pass 21 including a screw.

The photoreceptor drum 10 after removing of the remained toner is exposed to light by PCL11A and uniformly charged by the charging equipment 11, and then come in the next image forming cycle.

Figure 2:
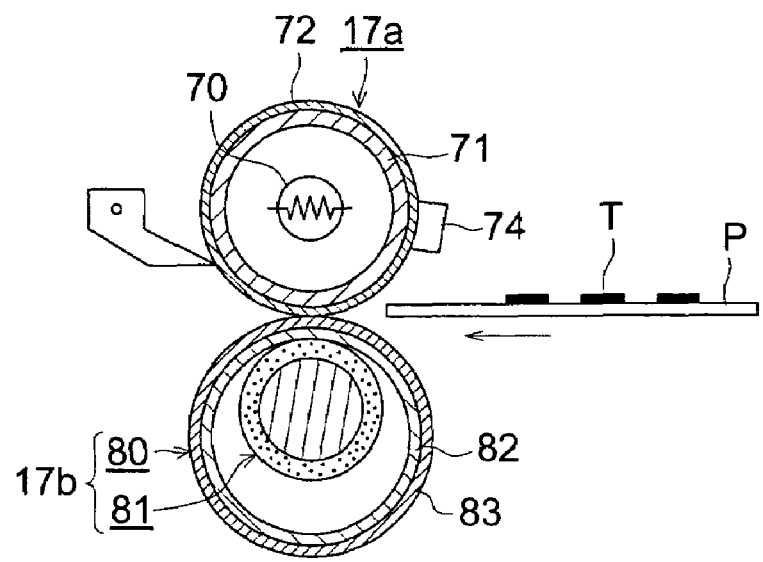
FIG. 2 shows a schematic front view of an example of a fixing equipment utilizing roller-in-roller system.

FIG. 2 shows a schematic front view of an example of fixing equipment utilizing roller-in-roller system.

Figure 3:
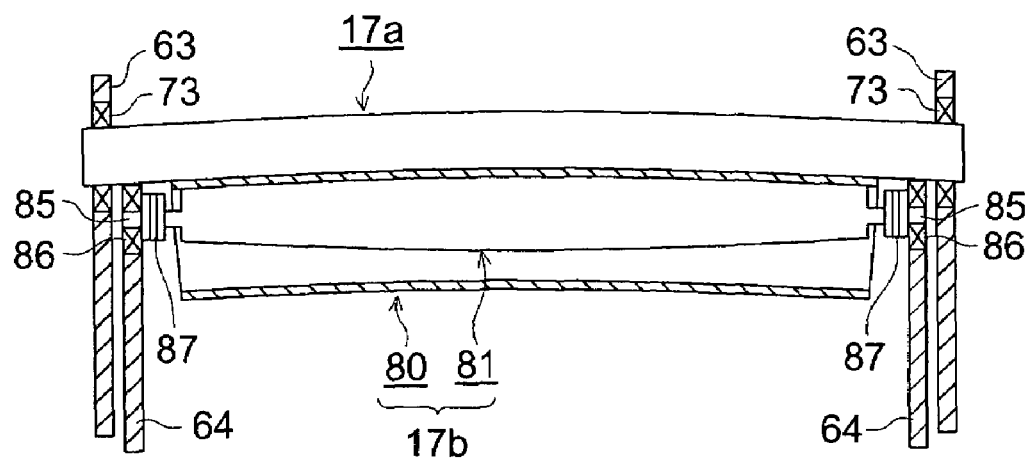
FIG. 3 shows a schematic side view of an example of a fixing equipment utilizing a roller-in-roller system.

FIG. 3 shows a schematic side view of an example of fixing equipment utilizing roller-in-roller system.

This fixing equipment is constituted by a heating roller 17a in which a heater 70 is attached and a pressure roller 17b contacted to the heating roller 17a. The recording paper P on which the unfixed toner image T is transferred is passed between the heating roller 17a and the 17b so that the toner is molten and pressed to the surface of the recording paper P and fixed. The pressure roller 17b is constituted by a hollow cylindrical pressing sleeve 80 which is rotated accompanied with the heating roller 17a and a pressing shaft 81 inserted into the hollow of the pressing sleeve. The pressing shaft 81 is pressed to the heating roller 17a so that the pressing sleeve 80 is contacted by pressure to the heating roller 17a.

The heating roller 17a is constituted by a cylindrical steel core 71, the outer periphery of which is coated by a PFA, perfluoroalkyl vinyl ether copolymer resin as a mold-releasing layer 72. The core has a diameter of 35 mm, a thickness of 0.4 mm and an effective length of 345.5 mm in the axis direction, and the mold-releasing layer 72 is coated so that the thickness is to be 30 μm. The core is supported at the both ends by a fixing frame 3 through a bearing 73, and rotated by a driving motor arranged out side of the drawing at a circumferential speed of about 300 mm/s. A quartz lamp (100V, 1,000 W) is arranged in the hollow of the core 71 as the heater 70. The heater 70 is fixed so as to pierce through the core 71. A temperature sensor 74 is contacted to the heating roller 1 and the on/off of the heater 70 is controlled according to the temperature detected by the sensor 74 so that the surface temperature is constantly held at a toner fixable temperature, for example 170° C.

The pressure sleeve 80 constituting the pressure roller 17b is a hollow stainless-steel core, on the outer peripheral surface of which an elastic layer 83 of silicone rubber is uniformly provided. The core 82 has an external diameter of 29 mm, a thickness of 0.3 mm and an effective length of 318 mm, and the elastic layer 23 has a thickness of 3 mm and a rubber hardness of 60 (JISA). The pressure sleeve 80 is only hung by the pressure shaft piercing through the hollow, and is not supported itself by the fixed frame 63 and the movable frame 63.

The pressure shaft 81 is a stainless steel part having a shape of gradually thinned from the central part to the both ends of the axis and the peripheral surface of it is convexly formed. The effective length of the pressure shaft 81 is 319 mm, the smallest external diameter in the effective length is 19 mm, and the periphery is covered by an elastic covering layer 84 of silicone rubber having a thickness of 1 mm. At the both ends of the pressure shaft 81, each an axis 85 is projected, and the axis 85 is supported by a movable frame 4 through a bearing 86.

A side guiding member 87 is fitted to the axis 85 of the pressure shaft 81 for regulating the move of the pressure sleeve 80 in the axis direction, the movement of the pressure sleeve in the axis direction (thrust direction) is restricted by colliding with the side of the side guiding member 83. When the side guiding member 87 is contacted with the elastic layer 83 of the pressure sleeve 80, the rotation speed of the pressure 80 is varied by the frictional resistance between them and a defect such as wearing is caused on the toner image T. Therefore, the elastic layer 83 of the pressure sleeve 80 is held so that the elastic layer is not contacted with the side guiding member 87 in the fixing equipment of this example.

Besides, the movable frame 64 is pressed to the side of the fixed frame 63 by a pressing member, not shown in the; drawing. Therefore, the pressure shaft 81 is pressed against the heating roller 17a so that the pressure sleeve is put between the heating roller 17a and the pressure shaft 81. As a result of that, the pressure sleeve is contacted by pressure with the heating roller 17a and rotated accompanied with the rotation of the heating roller 17a. When the heating roller 17a and the pressure sleeve are contacted by pressure, the elastic layer 83 formed on the periphery of the pressure sleeve 80 is squashed so as to form a nip area where the recording paper P is put between the heating roller 17a and the pressure roller 80. The recording paper P is given heat energy from the heating roller 17a during the passing through the nip area and the unfixed toner T transferred on the recording paper is molten. The molten toner is squashed by the pressure between the heating roller 17a and the pressure sleeve 80 and adhered to the recording paper. When the recording paper P is passed through the nip area, the toner image T transferred on the recording paper P is fixed to the recording paper P.

It is important for obtaining a suitable fixed image without insufficient fixing and wearing that the heating roller 17a and the pressure sleeve 80 are contacted by uniform pressure along the direction of axis. When the nip area is formed with uneven width along the axis direction, the conveying ability of the recording paper P is degraded and wrinkles tend to occur on the recording paper P passed through the fixing equipment. Therefore, it is also important that the nip area is formed with uniform width along the axis direction.

EXAMPLE

The invention is described in detailed below referring examples, but the embodiment of the invention is not limited to the examples. In the examples, "part" is "part by weight".

Example 1

| <Preparation of resin particle dispersion> | |
|---|---|
| Styrene | 370 g |
| n-butyl acrylate | 30 g |
| Acrylic acid | 8 g |
| Dodecane-diol | 24 g |
| Carbon tetrabromide | 4 g |

The above-mentioned was mixed and dissolved in a flask, and emulsified polymerized in a solution composed of 550 g of deionized water in which 6 g of nonionic surfactant Nonipol 400, produced by Sanyo Kagaku Co., Ltd., and 10 g of anionic surfactant Neogen SC, produced by Daiichi Kogyo Seiyaku Co., Ltd, were dissolved. And then 50 g of deionized water containing 4 g of ammonium persulfate was added while slowly stirring for ten minutes. After replacing by nitrogen gas, the contents of the flask was heated by 70° C. in an oil bath, and the emulsion polymerization was continued for 5 hours. Thus Resin Particle Dispersion 1 was obtained, which contained resin particles of 150 nm having a Tg of 58° C. and a weight average molecular weight of 11,500. The solid component concentration was 40% by weight.

| <Preparation of Colorant Dispersion> | |
|---|---|
| Carbon black | 60 g |
| Nonionic surfactant | 5 g |
| (Nonipol 400: Sanyo Kasei Co., Ltd.) | |
| Deionized water | 240 g |

The above components were mixed, dissolved and stirred for 10 minutes by a homogenizer Ultratalax T50, manufactured by IKA Co., Ltd., and then dispersed by an altimizer. Thus Colorant Dispersion 1 was prepared, in which colorant particles having an average diameter of 250 nm were dispersed.

| <Preparation of mold-releasing agent> | |
|---|---|
| Exemplified Compound 19 | 100 g |
| Cationic surfactant | 5 g |
| (Sanizole B50: Kao Co., Ltd.) | |
| Deionized water | 240 g |

The above components were dispersed for 10 minutes using a homogenizer Ultratalax T50, manufactured by IKA Co., Ltd., in a spherical stainless steel flask, and then dispersed by a pressure jet type homogenizer. Thus Mold-Releasing Agent Dispersion 1 with an average particle diameter of 550 nm was prepared.

| <Preparation of toner particle> | |
|---|---|
| Resin Particle Dispersion 1 | 234 parts |
| Colorant Dispersion 1 | 30 parts |
| Mold-Releasing Agent Dispersion 1 | 40 parts |
| Aluminum chloride | 1.8 parts |
| Deionized water | 600 parts |

The above components were mixed and dispersed by the homogenizer Ultratalax T50, manufactured by IKA Co., Ltd., in a spherical stainless steel flask, and then heated by 55° C. in a heating oil bath while stirring the contents of the flask. It was confirmed after holding the temperature at 55° C. for 30 minutes that coagulated particles having a volume average diameter D50 of 4.8 μm were formed. The temperature of the oil bath was raised and held at 56° C. for 2 hours, and the volume average diameter D50 was came to 5.9 μm. Thereafter, 32 parts by weight of the resin particle dispersion was added to the dispersion containing the coagulated particles, and then the temperature of the oil bath is raised by 55° C. and held for 30 minutes. To the dispersion containing the coagulated particles, an 1N sodium hydroxide solution was added so as to adjust the pH of the system to 5.0. After that, the stainless steel flask was hermetically closed and heated by 95° C. and held for 6 hours while continuously stirring using a magnetic seal. After cooled, the toner particles were filtered and washed for 4 times by deionized water and freeze-dried to obtain Toner Particle 1. The volume average diameter D50 of the obtained particles was 6.2 μm.

<Preparation of toner>

| | |
|---|---|
| Toner Particle 1 | 100 parts |
| Rutile-type titanium oxide | 0.8 parts |
| (Average diameter of primary particles: 20 nm, treated by n-decyltrimethoxysilane) | |
| Monodispersed spherical silica | 1.8 parts |
| (Silica sol prepared by the sol-gel method, treated by HMDS and dried and powdered, Warder spherical degree $\Psi$ = 0.92, volume average particle diameter = 137 nm, and standard deviation of particle diameter = 25 nm) | |

The above components were blended by a Henschel mixer at a circumference speed of 30 m/s for 15 minutes and sieved through a sieve having an opening size of 45 μm to remove coarse particles. Thus Toner 1 was obtained.

Example 2

<Preparation of mold-releasing agent-containing resin particle dispersion>

| | |
|---|---|
| Styrene | 370 g |
| n-butyl acrylate | 30 g |
| Acrylic acid | 8 g |
| Dodecanethiol | 24 g |
| Exemplified compound 19 | 50 g |
| Carbon tetrabromide | 4 g |

The above-mentioned was mixed and dissolved in an flask, and emulsified and polymerized in a solution composed of 550 g of deionized water in which 6 g of nonionic surfactant Nonipol 400, produced by Sanyo Kagaku Co., Ltd., and 10 g of anionic surfactant Neogen SC, produced by Daiichi Kogyo Seiyaku Co., Ltd, were dissolved. And then 50 g of deionized water containing 4 g of ammonium persulfate was added while slowly stirring for 10 minutes. After replacing by nitrogen gas, the contents of the flask was heated by 70° C. in an oil bath, and the emulsion polymerization was continued for 5 hours. Thus Mold-Releasing Agent-containing Resin Particle Dispersion 2 was obtained, which contained resin particles of 150 nm having a Tg of 58° C. and a weight average molecular weight of 11,500. The solid component concentration was 40% by weight.

<Preparation of colorant dispersion>

| | |
|---|---|
| Carbon black | 60 g |
| Nonionic surfactant | 5 g |
| (Nonipol 400: Sanyo Kasei Co., Ltd.) | |
| Deionized water | 240 g |

The above components were mixed, dissolved and stirred for 10 minutes by a homogenizer Ultratalax T50, manufactured by IKA Co., Ltd., and then dispersed by an altimizer. Thus Colorant Dispersion 2 was prepared, in which colorant particles having an average diameter of 250 nm were dispersed.

<Preparation of toner particle>

| | |
|---|---|
| Mold-Releasing Agent-containing Resin Particle Dispersion 2 | 234 parts |
| Colorant Dispersion 2 | 30 parts |
| Aluminum chloride | 1.8 parts |
| Deionized water | 600 parts |

The above components were mixed and dispersed by the homogenizer Ultratalax T50, manufactured by IKA Co., Ltd., in a spherical stainless steel flask, and then heated by 55° C. in a heating oil bath while stirring the contents of the flask. It was confirmed after holding the temperature at 55° C. for 30 minutes that coagulated particles having a volume average diameter D50 of 4.8 μm were formed. The temperature of the oil bath was raised and held at 56° C. for 2 hours, and the volume average diameter D50 was come to 5.9 μm. Thereafter, 32 parts by weight of the resin particle dispersion was added to the dispersion containing the coagulated particles, and then the temperature of the oil bath is raised by 55° C. and held for 30 minutes. To the dispersion containing the coagulated particles, a 1N sodium hydroxide solution was added so as to adjust the pH of the system to 5.0. After that, the stainless steel flask was hermetically closed and heated by 95° C. and held for 6 hours while continuously stirring using a magnetic seal. After cooled, the toner particles were filtered and washed for 4 times by deionized water and freeze-dried to obtain Toner Particle 2. The volume average diameter D50 of the obtained particles was 6.2 μm.

<Preparation of Toner>

| | |
|---|---|
| Toner Particle 2 | 100 parts |
| Rutile-type titanium oxide | 0.8 parts |
| (Average diameter of primary particles: 20 nm, treated by n-decyltrimethoxysilane) | |
| Monodispersed spherical silica | 1.8 parts |
| (Silica sol prepared by the sol-gel method, treated by HMDS and dried and powdered, Warder spherical degree $\Psi$ = 0.92, volume average particle diameter = 137 nm, and standard deviation of particle diameter = 25 nm) | |

The above components were blended by a Henschel mixer at a circumference speed of 30 m/s for 15 minutes and sieved through a sieve having an opening size of 45 μm to remove coarse particles. Thus Toner 2 was obtained.

Example 3

Toner 3 was obtained in the same manner as in Example 2 except that Exemplified Compound 19 used in Toner 2 was replaced by Exemplified Compound 18.

Example 4

Toner 4 was obtained in the same manner as in Example 2 except that aluminum chloride used in Toner 2 was replaced by poly(aluminum hydroxide).

Example 5

Toner 5 was obtained in the same manner as in Example 2 except that Exemplified Compound 19 used in Toner 2 was replaced by carnauba wax.

Example 6

Toner 6 was obtained in the same manner as in Example 2 except that aluminum chloride used in Toner 2 was replaced by magnesium sulfate.

The preparation methods of toner particles, the mold-releasing agent used in the preparation and the coagulation agents of Toners 1 through 6 are listed in Table 1.

TABLE 1

| Example | Toner No. | Preparation method of toner particle | Mold-releasing agent | Coagulation agent | Remarks |
|---|---|---|---|---|---|
| 1 | 1 | Resin particle + mold-releasing agent particle + colorant particle | Exemplified Compound 19 | Aluminum chloride | Inventive |
| 2 | 2 | Mold-releasing agent-containing resin particle + colorant particle | Exemplified Compound 19 | Aluminum chloride | Inventive |
| 3 | 3 | Mold-releasing agent-containing resin particle + colorant particle | Exemplified Compound 18 | Aluminum chloride | Inventive |
| 4 | 4 | Mold-releasing agent-containing resin particle + colorant particle | Exemplified Compound 19 | Poly (aluminum hydroxide) | Inventive |
| 5 | 5 | Mold-releasing agent-containing resin particle + colorant particle | Carnauba wax | Aluminum chloride | Comparative |
| 6 | 6 | Mold-releasing agent-containing resin particle + colorant particle | Exemplified Compound 19 | Magnesium sulfate | Comparative |

<Preparation of Developer>

Each of Toners 1 through 6 was mixed with a silicone coated manganese-ferrite carrier of 60 Mm by a Henschel mixer to prepare Developers 1 through 6 having a toner concentration of 6% by weight.

<Evaluation>

An electrophotographic digital multi-functional copying machine Sitios 7075HV, manufactured by Konica Corp., having a trickle type fixing equipment, referred to as Evaluation Machine A, and another Sitios 7075HV in which the fixing equipment is replaced by a roller-in-roller fixing equipment, referred to as Evaluation Machine B, were used for evaluation.

The developers using the toners were each set the evaluation machines and printing was carried out under an ordinary temperature and humidity, 20° C. and 50% RH, to performing the evaluation as to the following items.

<Fixing Ability on Extreme Thick Mail Card Such as a Mourning Mail Card>

Five hundreds mourning mail cards, manufactured by Heart Co., Ltd., having a thickness of 0.4 mm were subjected to continuous printing. Gray colored frame with a relative optical density of 0.5 was printed on each of the cards. The 500$^{th}$ printed card was subjected to the evaluation of the fixing ability according to the following norms.

Evaluation Norms

A: Toner was not peeled off at all even when letters were written with strong force by a pen and a ball point pen on the gray frame of the mourning mail card; the fixing ability was excellent.

B: Toner was peeled off when letters were written by the pen on the gray frame of the mourning mail card but the toner was not peeled off when the ball point pen was used; the fixing ability was good.

C: The hands of the evaluator was contaminated by the toner only when he handled the gray frame of the mourning mail card since the fixing was insufficient; the fixing ability is poor.

<Fixing Ability on Paper for Off-Set Printing>

Character image was printed on 250 sheets of paper for paperbacks for off-set printing having a weight of 60.2 g/m$^2$. The last 10 sheets of the prints were turned by the thumb of one hand and the spreading contamination around the characters was observed.

Evaluation Norms

A: The spreading contamination was not observed at all; fixing ability is excellent.

B: The spreading contamination is not visually observed, but slight contamination was observed through a loupe, and the lacking of the surface of the toner layer was observed by an electron microscope; there is no problem on the practical use.

C: The marks of the thumb were contaminated as blacken spreading; the fixing ability was poor.

<Toner Blister>

A printed image was prepared on common paper having a weight of 64 g/m$^2$ by controlling the process so that the adhered amount of the toner was 16 mg/cm$^2$. The presence of hole with a diameter of from 0.1 to 0.5 mm or toner blister, in the image was detected by a microscope.

Evaluation Norms

A: There was no toner blister; no problem.

B: There were 1 or 2 per 4 cm$^2$ toner blisters but they were not observed visually unless gazing.

C: There are 3 or more per 4 cm$^2$ of apparent toner blisters.

<Contamination of Interior of Machine>

The amount of toner scattered under the developing equipment after 200,000 sheet-of copying.

Evaluation Norms

A: Scattered toner is not detected and the machine can be continuously used.

B: When the scattered area was touched by hand, the hand was contaminated in some degree, but the machine can be continuously used without cleaning.

C: The machine can be continuously used when it was cleaned by a dry cloth.

D: The scattered toner cannot be sufficiently wiped by the dry cloth, a vacuum cleaner was necessary for cleaning the toner.

The machine used for the evaluation and the results of the evaluation of the fixing ability on the extreme thick mail card, the fixing ability on the off-set printing paper, the toner blister and the contamination of interior of machine are listed in Table 2.

TABLE 2

| Toner No. | Evaluating machine | Fixing ability on extreme thick paper | Fixing ability on off-set printing paper | Toner blister | Contamination of interior of machine | Remarks |
|---|---|---|---|---|---|---|
| 1 | A | A | A | A | B | Inv. |
| 2 | A | A | A | A | A | Inv. |
| 2 | B | A | A | A | A | Inv. |
| 3 | A | A | A | A | B | Inv. |
| 4 | A | A | B | A | A | Inv. |
| 5 | A | C | C | B | D | Comp. |
| 6 | A | B | C | C | D | Comp. |

Inv.; Inventive
Comp.; Comparative

It is proved in the examples that the toner producing the toner and the image forming method using the according to the invention displays the excellent such as that the fixing ability on the extreme thick and the off-set printing paper is excellent, the toner is not formed, and the contamination by the scattered does not occur.

What is claimed is:

1. A method for producing toner comprising:
   coagulating at least one crystalline ester compound represented by Formula 1 and resin particles in an aqueous medium in the presence of an aluminum compound, wherein said aluminum compound is used as a coagulation agent; and
   washing coagulated particles so that the amount of the coagulation agent remained in the toner is reduced;

$$R_1-(OCO-R_2)_n \qquad \text{Formula 1}$$

wherein, $R_1$ and $R_2$ are each a carbon hydride group having from 1 to 40 carbon atoms which may have a substituent and n is an integer of from 1 to 4.

2. The method for producing the toner of claim 1 wherein an irregular-shaped particle having a polarity reverse to the charging property of the toner is externally added to the toner particle.

3. The method for producing the toner of claim 1, wherein a monodispersed spherical silica having a volume average particle diameter of from 80 to 300 nm is externally added to the toner.

4. The method for producing the toner of claim 1, wherein the aluminum compound is at least one selected from a metal salt.

5. The method for producing the toner of claim 4, wherein the carbon hydride group represented by $R_2$ has from 16 to 30 carbon atoms.

6. The method for producing the toner of claim 1, wherein the volume average diameter of the resin particle is from 50 to 2,000 nm.

7. The method for producing the toner of claim 1, wherein the carbon hydride group represented by $R_1$ has 1 to 20 carbon atoms, the carbon hydride group represented by $R_2$ has 16 to 30 carbon atoms and n is an integer of from 2 to 4.

8. A method for forming an image comprising:
   developing a static latent image formed on a photoreceptor by the toner obtained by the method of claim 1,
   transferring the toner image formed on the photoreceptor onto an image receiving material,
   separating the image receiving material having the transferred toner image from the photoreceptor, and
   thermally fixing the toner image onto the image receiving material.

9. The method for forming the image of claim 8, comprising recovering the toner remained on the photoreceptor after the transferring.

10. The method for forming the image of claim 8, wherein the step of thermally fixing the toner image transferred onto the image receiving material comprises passing the image receiving material between a heating roller and a pressure roller.

11. A method for producing toner comprising:
    coagulating particles (A) comprising at least one crystalline ester compound represented by Formula 1 and a resin with resin particles (B) in an aqueous medium in the presence of an aluminum compound, wherein said aluminum compound is used as a coagulation agent; and
    washing coagulated particles so that the amount of the coagulation agent remained in the toner is reduced;

$$R_1-(OCO-R_2)_n \qquad \text{Formula 1}$$

wherein, $R_1$ and $R_2$ are each a carbon hydride group having from 1 to 40 carbon atoms which may have a substituent and n is an integer of from 1 to 4.

12. The method for producing the toner of claim 11, comprising adding a droplet of the ester compound to a solution of a polymerizable monomer and-polymerizing the polymerizable monomer.

13. The method for producing the toner of claim 11, comprising preparing a resin particle dispersion containing the resin particle (B), preparing a particle (A)-containing dispersion containing Particle (A), and preparing a colorant dispersion containing a colorant particle, and preparing coagulated particle by coagulating the particle (A), the particle (B) and the colorant particle in an aqueous medium in the presence of the aluminum compound.

14. The method for producing the toner of claim 11, comprising dissolving the ester compound into the polymerizable monomer solution, preparing the dispersion of the resin particle (A) containing the ester compound, and preparing a coagulated particle by coagulating the rosin particle (A) with resin particle (B) containing a colorant particle in an aqueous medium in the presence of the aluminum compound.

15. The method for producing the toner of claim 11, comprising adding the polymerizable monomer into a solution containing the ester compound, and polymerizing the polymerizable monomer.

16. The method for producing the toner of claim 11, comprising adding the polymerizable monomer and a droplet of the ester compound into the dispersion of the resin particle (B).

17. The method for producing the toner of claim 11 wherein an irregular-shaped particle having a polarity reverse to the charging property of the toner is externally added to the toner particle.

18. The method for producing the toner of claim 11, wherein a monodispersed spherical silica having a volume average particle diameter of from 80 to 300 nm is externally added to the toner.

19. The method for producing the toner of claim 11, wherein the aluminum compound is at least one selected from a metal salt.

20. The method for producing the toner of claim 11, wherein the volume average diameter of rho particle (A) is from 50 to 2,000 nm.

21. The method for producing the toner of claim 11, wherein the carbon hydride group represented by $R_1$ has 1 to 20 carbon atoms, the carbon hydride group represented by $R_2$ has 16 to 30 carbon atoms and n is an integer of from 2 to 4.

* * * * *